No. 891,734. PATENTED JUNE 23, 1908.
C. REYNOLDS & A. J. SEAMAN.
MACHINE FOR INSERTING WIRES IN PACKAGE HANDLES.
APPLICATION FILED NOV. 29, 1905.
6 SHEETS—SHEET 5.
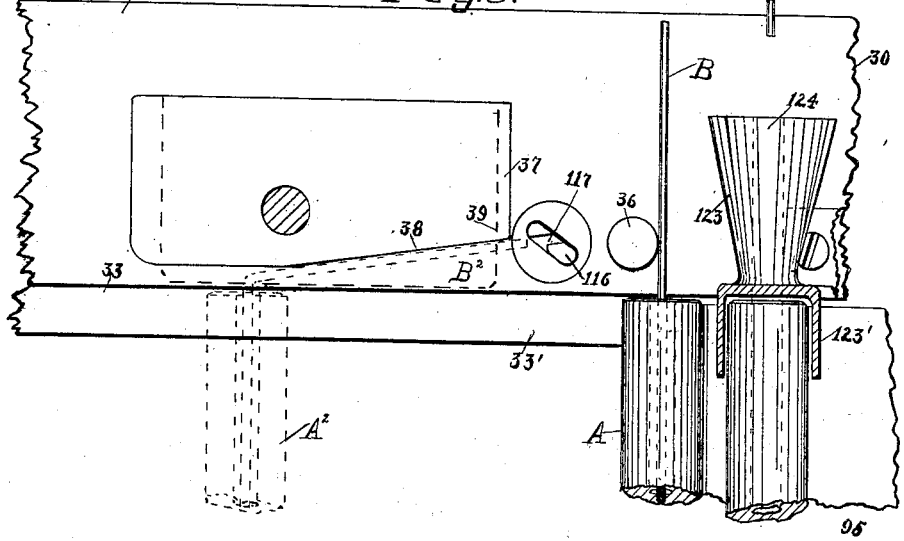
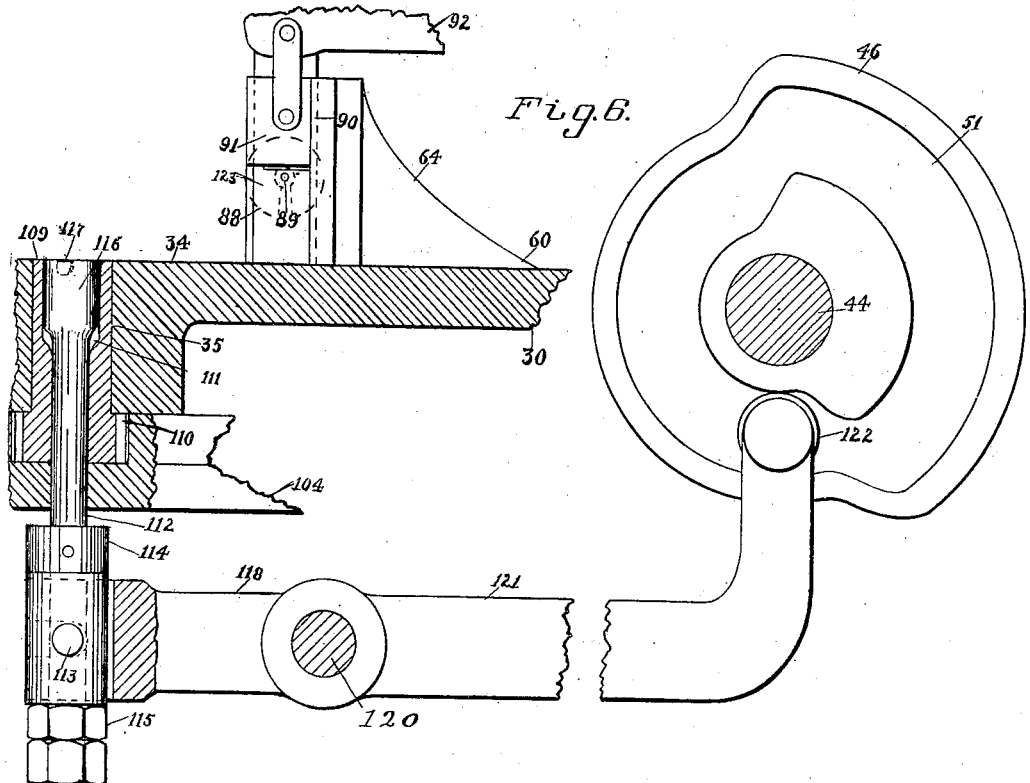
Witnesses.
Jon. A. Butler
Raphael G. Blane
Inventors.
Clark Reynolds
Albert J. Seaman
By Henry J. Miller
atty No. 891,734. PATENTED JUNE 23, 1908.
C. REYNOLDS & A. J. SEAMAN.
MACHINE FOR INSERTING WIRES IN PACKAGE HANDLES.
APPLICATION FILED NOV. 29, 1905.

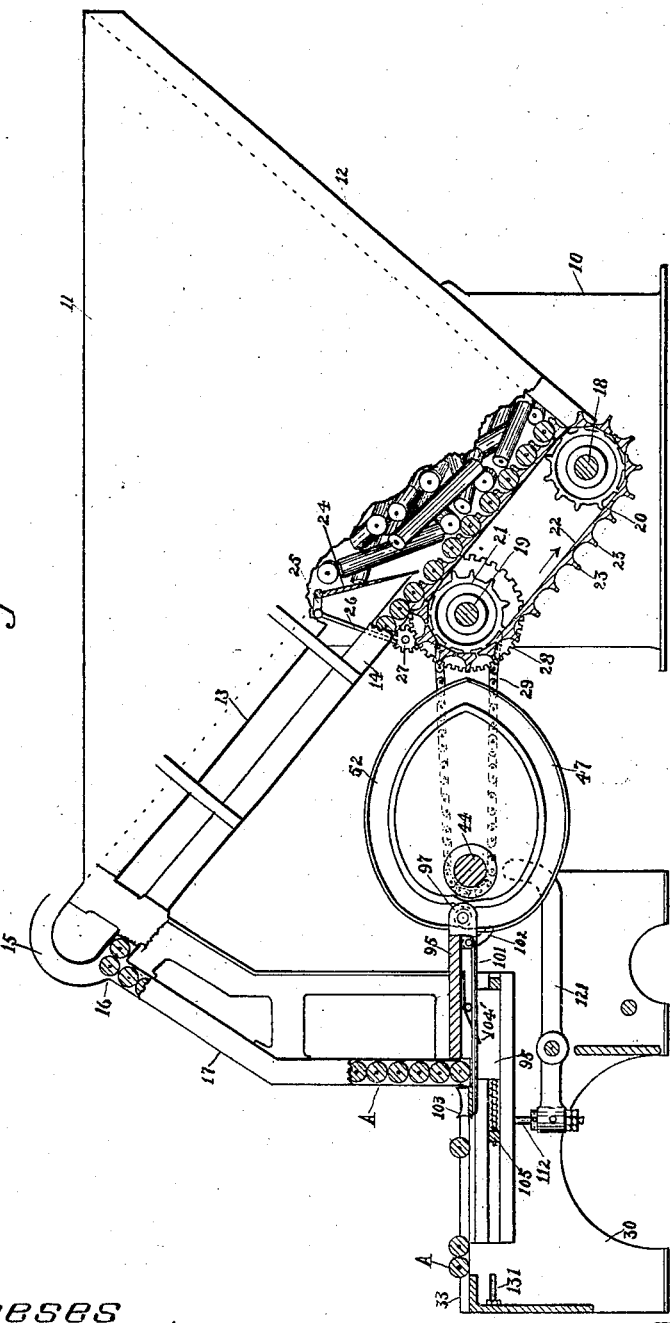

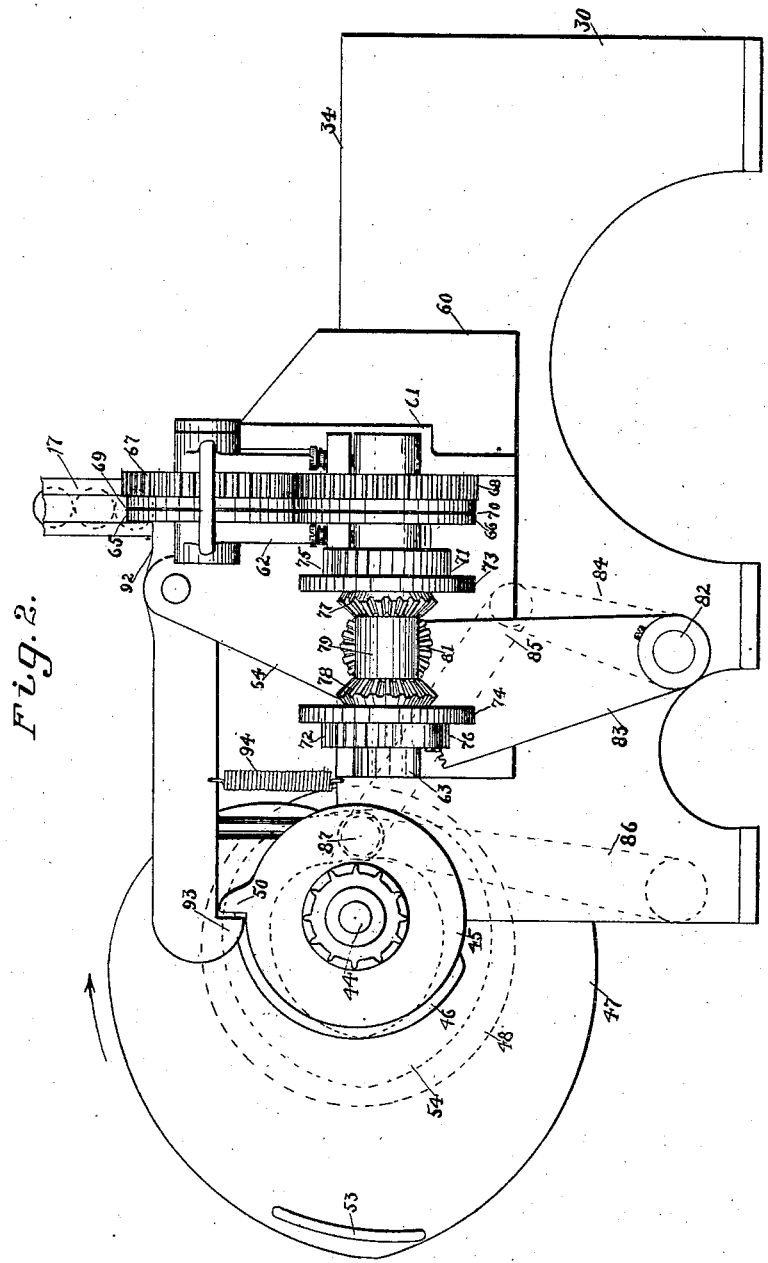

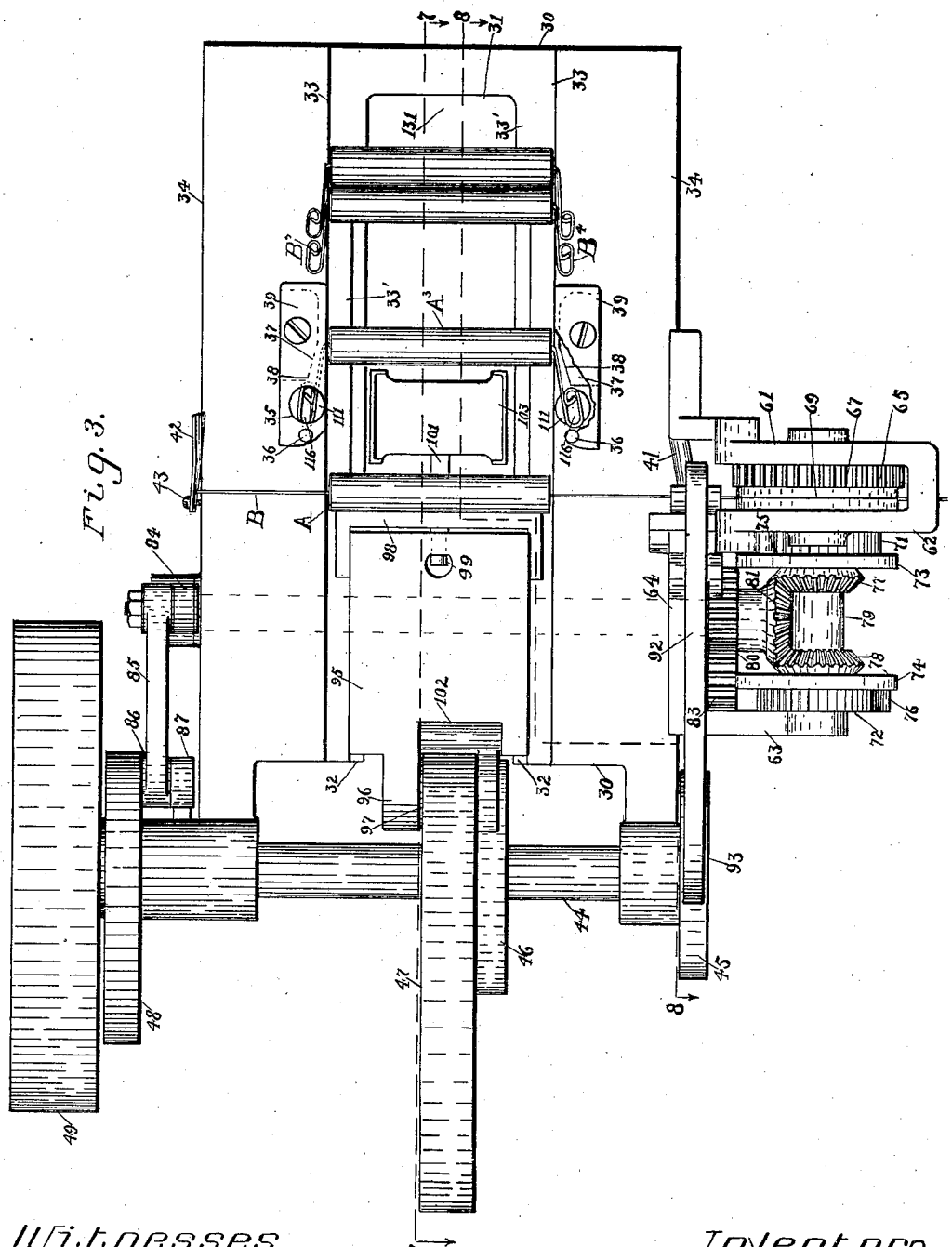

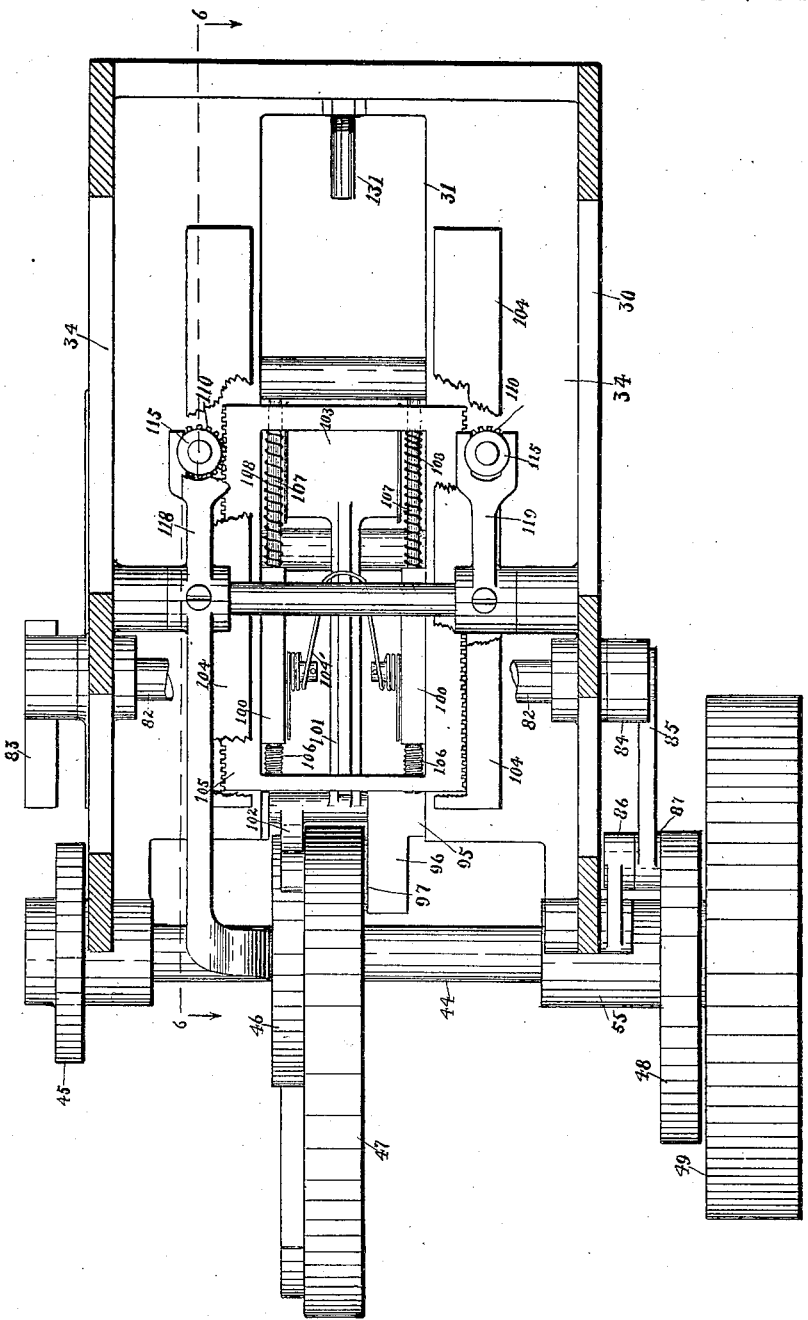

6 SHEETS—SHEET 6.

Witnesses.
Jas. A. Butler
Raphael G. Blanc

Inventors
Clark Reynolds
Albert J. Seaman
By Henry J. Miller
atty.

THE NORRIS PETERS CO., WASHINGTON, D. C.

UNITED STATES PATENT OFFICE.

CLARK REYNOLDS AND ALBERT J. SEAMAN, OF BOSTON, MASSACHUSETTS, ASSIGNORS OF FORTY-NINE ONE-HUNDREDTHS TO THEMSELVES, AND FIFTY-ONE ONE-HUNDREDTHS TO DANIEL W. HOWLAND, OF BROOKLINE, MASSACHUSETTS.

MACHINE FOR INSERTING WIRES IN PACKAGE-HANDLES.

No. 891,734.  Specification of Letters Patent.  Patented June 23, 1908.

Application filed November 29, 1905. Serial No. 289,665.

*To all whom it may concern:*

Be it known that we, CLARK REYNOLDS and ALBERT J. SEAMAN, both of Boston, in the county of Suffolk and State of Massachusetts, have invented certain new and useful Improvements in Machines for Inserting Wires in Package-Handles; and we hereby declare that the following is a full, clear, and exact description of the same, reference being had to the accompanying drawings, forming part of this specification.

This invention has reference to improvements in machines for inserting wires in package handles and particularly in such machines which are designed to bend the end portions of the wire.

One object of the invention is to so construct a machine of this nature that a plurality of handles may be operated upon at the same time.

Another object of the invention is to so construct a machine of this nature that wire may be inserted in one handle while the wire previously inserted in the preceding handle is being bent and the ends of the same twisted.

Another object of the invention is to improve the means for supporting the handle during the insertion of the wire.

Another object of the invention is to improve the means for twisting the ends of the wire, together with the mechanism for carrying the ends of the wire into engagement with the twisters.

Another object of the invention is to improve the mechanism for feeding the handles to the machine.

Other objects of the invention will appear from the following description.

The invention consists in such peculiar features of construction and combination of parts whereby the objects of the invention are carried into effect as will hereinafter be more fully described and pointed out in the claims.

Figure 7:
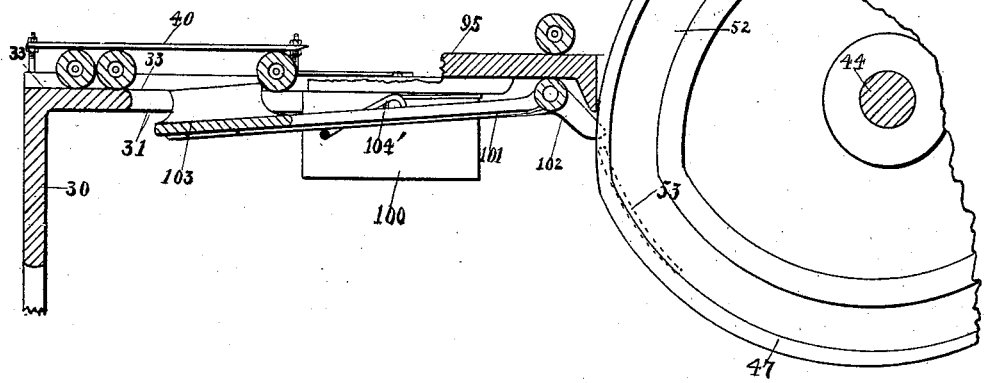
Figure 8:
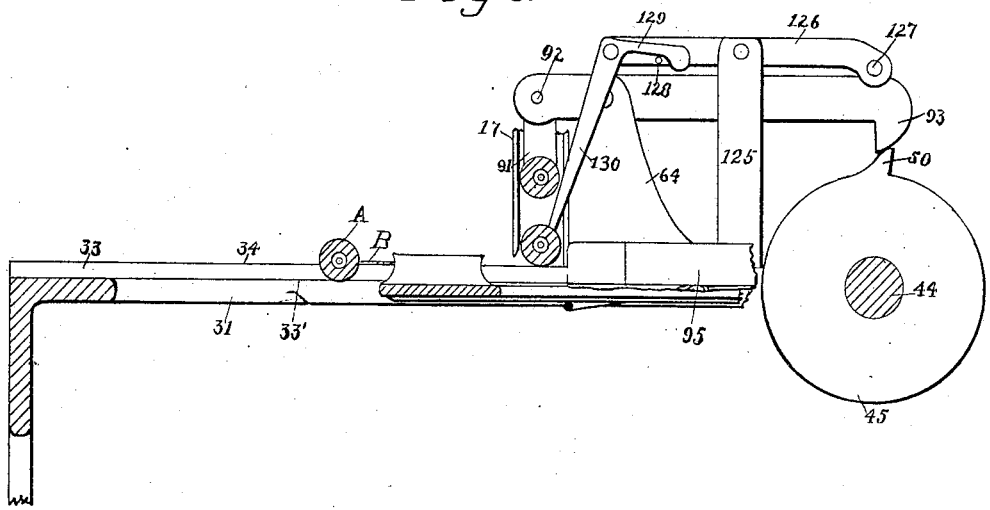

Figure 1 represents a side elevation of the improved machine for inserting wire in package handles together with the handle feeding mechanism, parts of the same being broken away and other parts being shown in section. Fig. 2 represents an enlarged side elevation of the wire inserting and bending machine from the side opposite to that shown in Fig. 1. Fig. 3 represents a top plan view thereof. Fig. 4 represents a bottom plan view of the machine, parts of the same being broken away. Fig. 5 represents a top plan view of parts of the machine showing one end of the wire in a handle as about to enter one of the twisters and another handle in position to receive a wire. Fig. 6 represents a longitudinal sectional view of parts of the machine taken on line 6—6, Fig. 4, to more clearly show the contruction of the twisters and the means for operating the same, also showing the wire cutter. Fig. 7 represents a similar view of parts of the machine taken on line 7—7, Fig. 3, to more clearly indicate the means for drawing back the handle and its wire to engage the ends of the wire with the twisters. Fig. 8 represents a similar view of parts of the machine taken on line 8—8, Fig. 4.

Similar numbers of reference designate corresponding parts throughout.

The machine forming the subject matter of this application is designed to feed forward axially perforated cylindrical grips or handles, placed in a hopper, to a suitable position, to insert a wire through said perforation, to cut said inserted wire from the main wire, to bend the portions of the wire extending from the handle at angles therewith, to then twist the ends of the wire to form hooks for engaging the tying string of a parcel, and finally to feed the completed handle from the machine.

As shown in the drawings, in its preferred form 10 represents a base of any usual construction adapted to support a hopper 11 having inclined sides 12 and 13 and furnished with the inclined chute 14 having the return bend 15 in the lower wall of which is formed the opening 16 communicating with the delivery chute 17 which leads to the wiring machine. On shafts 18 and 19 journaled in bearings of the base 10 are the sprockets 20 and 21 on which is mounted the handle feed chain 22 having the projections 23—23 the distance between which is but slightly greater than the diameter of one of the handles to be engaged therebetween. The upper reach of this chain 22 works in the hopper 11 and partly in the lower end of the chute whereby, when the chain is driven in the direction indicated by the arrow in Fig. 1, the handles engaged by said chain are fed upward in said chute while, when the chute 17 is filled with the handles, as shown in Fig. 1, the surplus handles are returned to the hopper 11 through the bend 15.

In the hopper 11 is pivotally mounted the pusher plate 24, the arm 25 of which has the rod 26 pivoted to said arm and to the pinion 27 rotatably mounted on the base 10 and engaging the gear 28 on the shaft 19, the rotation of said shaft, by means of the chain 29, working on a suitable sprocket thereon, effecting the rotation of the pinion 27 and the constant vibration of the plate 24 to push backward the handles loosely contained in the hopper 11.

The wiring machine proper, to which the handles are fed by the above described mechanism in approximately the position shown at 17, Fig. 2, comprises the main frame 30 having the longitudinal central openings 31 at the sides of which are guides 32—32 and the ways 33—33, the latter formed by the inner edges of the top frame members 34—34 which are furnished with the vertically extending bearings 35—35 and to which are secured the pins 36—36 and the guide plates 37—37 having the inclined edges 38—38, the members 34—34 being also furnished with the guide plates 40—40 sufficiently raised above the bottom of the way 33 to permit the passage of a handle thereunder. At the sides of these members 34—34 are mounted the wire-guide or gage plates 41—42 which have adjusting means, as the screw 43, and are equally distant from the vertical edges of the way 33.

At one end of the frame 30 is journaled the drive shaft 44 carrying the cams 45, 46, 47, and 48, and the driving pulley 49 adapted to be driven by any usual driving means. The cam 45 has the lifting tooth 50, the cam 46 has the cam path 51, see Fig. 6; the cam 47 has the cam path 52 and preferably, the bearing plate 53, see Fig. 7; and the cam 48 has the cam path 54.

Mounted on one side of the frame 30 is the frame 60 furnished with the plates 61, 62, the arm 63 and the standard 64. Between the plates 61 and 62 are journaled the wire feed rolls 65 and 66 having respectively the gear teeth 67, and 68, which intermesh, and the grooves 69 and 70 between which a wire of suitable size may be received and fed forward when said rolls are rotated. The shaft of the roll 66 extends to and is journaled in the arm 63 and on this shaft between the plate 62 and the arm 63 are mounted the ratchets 71 and 72 which rotate with the shaft. Between these ratchets are loosely mounted on the shaft the pawl plates 73 and 74 carrying the pivoted pawls 75 and 76 and having the bevel gears 77 and 78 which are separated by the sleeve 79 on said shaft, and the ratchets 71 and 72 have teeth extending in opposite directions so that the alternate rotation of the gears 77 and 78 in opposite directions effects the rotation of the ratchets 71 and 72 through the alternate engagement of the pawls 75 and 76 with said ratchets whereby the shaft carrying the roll 66 is driven periodically in one direction.

On a stud extending from the lower part of the standard 64 is rotatably mounted the pinion 80 having the bevel gear 81 which meshes with the gears 77 and 78. Journaled in the sides of the frame 30 is the shaft 82 on which is fixed the quadrant 83 the teeth of which engage with the pinion 80; and this shaft 82 has the arm 84 which is pivotally connected by the link 85 with the arm 86 pivotally mounted at the side of the frame 30, a bearing 87 located at the juncture of the link 85 and this arm 86 being provided which is free to work in the path 54 of the cam 48, whereby the arm 86 is alternately swung back and forth this motion being transmitted to the quadrant 83 to alternately rotate the pinion 80 and its gear 81.

Secured to the inner portion of the frame 60 is the plate 88 having the perforation 89 in line with the grooves 69 and 70 of the wire feed rolls 65 and 66, and at the sides of this plate are formed guides as 90 in which the cutter blade 91 is free to move vertically when operated by the lever 92 pivotally connected with said blade 91 and pivotally supported on the standard 64, the free end 93 of this lever being given an upward movement at each rotation of the shaft 44 by the tooth 50 of the cam 45 riding thereunder. The shape of this tooth 50 permits the quick downward movement of this end 93 of the lever 92, immediately after said upward movement, under the drawing action of the spring 94, connected to said lever and to a fixed part of the machine, as it is desirable to quickly open the perforation 89 to permit the feeding of the wire.

Slidably mounted on the guides 32—32 is the carriage 95 having at the rear end the extension 96 furnished with the bearing 97 which is engaged in the path 52 of the cam 47, see figures 1 and 4, and having at the forward end the pusher 98 mounted to be adjusted by means of the screw 99, and from this carriage depend the members 100—100. At the under side of the rear end of the carriage 95 is pivotally mounted the arm 101 having at its rear end the finger 102 and at its forward end the frame 103, the spring 104' mounted on the members 100 and bearing on the forward end of the lever tending to lift this end with the frame upward while the lip 53 on the cam 47, engages the finger 102 when the carriage 95 is in the forward position to depress the forward end of the arm 101 and its frame 103 to the position shown in Fig. 7, but this positive means for depressing the forward end of this arm 101 is not essential to the operation of the machine, as will hereafter be pointed out.

At the under side of the machine bed are the plates 104—104 to form supports on which the rack 105 is free to slide; and this rack has teeth along its side edges and is open at the center to receive the members 100—100 of the carriage 95. In the rear bar of the rack are adjustable screws 106—106, the forward ends of which bear against the rear ends of the members 100—100, at times, and the forward bar of the rack has perforations, indicated in dotted lines in Fig. 4, through which the rods 107—107, fixed in the forward ends of the members 100—100, may move at times, these rods 107 carrying coiled springs 108—108 which bear against the front bar of the rack 105 and against the forward ends of said members 100.

Journaled in the bearings 35 of the frame members 34 are the limbs 109—109 having pinions 110—110 which are supported by plates 104 and are engaged by the teeth of the rack 105, and these hubs 109 have axial bores enlarged at the upper ends to form pockets 111—111 of a flattened oval shape, in plan view, as shown in Figs 3 and 5. In the bores of the limbs 109—109 are mounted, for lengthwise movement, the twister shanks 112—112 having the pins 113 and the nuts 114—114 and 115—115 at their lower ends and the twisters 116—116 at their upper ends. These twisters are flattened oval in cross section to loosely fit the pockets 111—111 and are slightly shorter than said pockets as is shown in Fig. 6, and through the twisters are formed the slots 117—117 extending diagonally to the sides of the twisters and open at their upper ends.

The pins 113—113 of the twister shanks 112—112 are engaged in slots in ends of the arms 118—119, which ends are engaged between the nuts 114—114 and 115—115, and these arms are fixed on the shaft 120 mounted to rock in bearings of the frame 30, the arm 118 having the lever extension 121 furnished with a bearing 122 which is engaged in the way 51 of the cam 46.

Supported on the top of the machine frame is the trumpet guide 123 which is furnished at its lower portion with the channel 124 indicated in dotted lines in Fig. 5; this trumpet is located in line with the perforation 89 through which the wire is fed to the machine, the purpose of the trumpet being to guide the wire to the perforation of the handle. On the top 34 of the machine frame is mounted the standard 125 furnished at the upper end with the pivoted lever 126 which has the laterally extending pin 127 bearing on the end 93 of the lever 92 and having the stop 128 which supports the weighted end 129 of the pusher finger 130 pivotally mounted on said lever 126. Adjustably secured at the front end of the machine frame is the stop screw 131 which is so placed that it may intercept the front-bar of the rack 105 at the end of its forward movement.

As the handles A are fed into the chute 17, as above described, they pass downward through said chute until they successively rest on the upper surface of the table 95, which at this time is located as shown in part in Fig. 5; and the end of the handle A, being engaged between the fingers or plates 123′ of the trumpet 123, has its axis in line with the perforation 89. Immediately after the handle A is brought to this position the rack 83 is swung, through its connections with the bearing 87 and the path of the cam 48 acting on said bearing to partially rotate the pinion 80 and its gear 81 to drive one or the other of the bevel gears 77 or 78 and the pawl plate and pawl connected therewith whereby the shaft of the wire feed roll 66 is driven in a direction to feed forward the wire engaged between the rolls 65 and 66, this feeding action being very rapid carries the wire quickly through the perforation in trumpet 123 and through the perforation in the handle A and beyond the further end of the handle, the length of wire so fed being determined by the diameter of the rolls 65 and 66 and the relative speed at which the driving mechanism is moved. When the wire B has thus been fed through the handle A the end 93 of the lever 92 is raised by the tooth 50 of the cam 45 and the cutter 91 is moved downward to cut the wire B from the main wire and leaving the cut end of the wire free to drop down through the slot 124 in the trumpet 123. Approximately, as the cutting of the wire is accomplished the table 95 is moved backward by its connection with the cam 47 to the point shown in Figs. 1 and 8 and the handle A with its wire B drops between the ways 33 of the top frame members 34—34 resting on the surface 33′ in front of the bar 98 of the carriage 95. The continued rotation of the shaft 44 now effects the forward movement of the carriage 95, the bar 98 of which pushes forward the handle A with the wire B extending loosely through the perforation of the handle; and if the extension of the wire B from one end of the handle is greater than at the other end, such longer end will be moved inward by riding against its corresponding gage plate 41 or 42, as the case may be, as the handle A when in the guides 33—33 is centered with reference to such gage plates.

Soon after the forward movement of the handle A, and the straight wire B, begins, the ends of the wire are intercepted by the pins 36—36 while the handle continues its movement and draws the wire with it, thus drawing the ends of the wire between the pins 36—36 and bending the ends of the wire at angles with the handle approximately as shown in broken lines in Fig. 5. At this point the handle passes under the plates 40—40 and the bent ends of the wire enter beneath the plates 39—39, as shown in Fig. 5, immediately prior to which point of operation the forward limit of movement of the rack 105 has been reached, and the twisters have been rotated to the position shown in said figure at or about the time the rack is brought against the pin 131, while the carriage 95 has continued its movement slightly beyond this point to carry the ends of the wire B beyond the twisters, this motion being permitted by the extensions 100—100 moving in the open center of the rack and compressing the springs 107—107, the rods 108—108 moving through the perforations of the front bar of the rack, the springs 107—107 tending to hold the rack against the screw 131. The carriage 95 being now drawn backward, by the action of its cam, moves independently of the rack 105 until the rear ends of the members 100—100 reach the ends of the screws 106—106, consequently the twisters remain in position shown in Fig. 5 during this initial rearward movement of the carriage in which period the frame 103 acts against the handle A to draw the same backward until the ends of the wire B are engaged in the slots 117—117 of the twisters 116—116 at which time the rear ends of the members 100—100 are brought against the ends of the screws 106—106 and the rack 105 begins to move backward with the carriage to cause the rotation of the twisters 116—116, by the action of the rack on the pinions 110, to twist the ends of the wire.

At or about the commencement of the twisting operation the resistance to the rearward movement of the handle and its wire becomes such that the lifting action of the spring 104' on the arm 101 is overcome and the frame 103 of said arm draws down under the handle A as is shown in Fig. 7, leaving the handle and its wire approximately in the position shown at $A^3$ in Fig. 3. In order to positively insure the depression of the frame 103 at this time we have shown the arm 101 as provided with the finger 102 which is adapted to be engaged and tripped by the lip 53 on the cam 47. During the backward movement of the carriage 95 the ends of the wire are completely twisted preferably to the shape shown in Fig. 3 at $B^4$—$B^4$ and the twisters 116—116 have been drawn down out of engagement with said twists by the operation of the levers 118—119 leaving the finished handle $A^3$ free to be pushed forward out of the way by the front end of the frame 103 as the carriage again advances. When the carriage 95 is retracted to permit the dropping downward of the handle A, the handle sometimes sticks, and to positively force the handle down to position the finger 130 is used, and this finger is free to swing out of the way of a handle descending the chute 17 but thereafter engages the handle and pushes it downward as said finger is swung by the action of the pivoted lever 126. As the first of the pair of handles drops down before the carriage 95, the second handle will rest on the first and be supported at a height where the carriage will ride under and support it while the wire is being inserted therein and cut off, this being accomplished while the first handle is being fed forward and its wire bent and twisted.

While we have herein shown and described specific means for accomplishing the objects of our invention, it is not our intention to thereby limit this invention to such specific means or to specific combinations thereof but only as herein claimed.

Having thus described our invention we claim as new and desire to secure by Letters Patent.

1. A package handle wiring machine comprising a movable carriage adapted to support a handle in position to receive a wire, wire feeding means, wire cutting means, mechanism for moving the carriage with respect to the handle to permit the handle to drop before the carriage and to thereafter move the carriage in the opposite direction to feed forward the handle.

2. A package handle wiring machine comprising a guide adapted to receive a handle in the transverse position, wire bending devices located at the sides of said guide, means for feeding forward a handle in said guide, handle feeding means for feeding a handle towards the guide, and wire feeding means adapted to feed a wire through the handle before the handle reaches the guide.

3. A package handle wiring machine comprising wire twisting means normally out of the path in which the wire is fed forward with the handle, handle feeding means, twister moving means for moving the twisters into the path of the wires, and means for effecting the engagement of the wires with the twisters.

4. A package handle wiring machine comprising twisting means normally located out of the path in which the handle wire is fed forward with the handle, means for feeding forward the wire beyond the twister, means for moving the twister into said path, and means for retracting the wire to engage it with the twister.

5. A package handle wiring machine comprising a guide in which a handle and its wire may be fed forward in the transverse position, wire bending devices located at the sides of the guide, wire twisting devices normally located out of the path of the wire, means for moving the twisters into said path, means for feeding forward the handle wire beyond the twisters, and means for retracting the wires to engage the same with the twisters.

6. A package handle wiring machine comprising a guide in which a handle, and its wire, may be fed forward in the transverse position, wire bending devices located at the sides of the guide, wire twisters having slotted heads mounted to rotate and reciprocate at the sides of the guide, means for feeding forward the handle and its wire to a point beyond the twisters, means for reciprocating the twisters to bring them in the path of the wires, and means for retracting the handle and its wire to engage the ends of the wire in the slots of the twisters.

7. A package handle wiring machine comprising a guide in which a handle may be located, a fixed member, located at the side of the guide, over which the handle wire may extend, a twister mounted to rotate and reciprocate in a bore of said member, means for reciprocating the twister to project it beyond said fixed member, means for engaging the wire with the twister, and means for retracting the twister to disengage the twisted end of the wire.

8. A package handle wiring machine comprising a guide in which a handle may be fed forward in the transverse position with the wire extending beyond the sides of the guides, wire twisting means at the sides of the guide, means for feeding forward the handle and its wire beyond the twisters, and means for retracting the handle and wire to engage the wire with the twisters, said retracting means being adapted to move under the handle after the wire is engaged by the twisters.

9. A package handle wiring machine comprising a guide adapted to receive a handle in the transverse position with the wire extending beyond the guide, wire twisters located at the sides of the guide, means for feeding forward the handle and wire beyond the twisters said means being adapted to move under the handle after such engagement and, at the next feeding action of the handle feed, to push forward the handle last acted upon by the twisters.

10. A package handle wiring machine comprising a guide adapted to receive a handle in the transverse position with the wire extending beyond the guide, wire bending devices located at the sides of the guide, wire twisting devices located at the sides of the guide beyond the bending devices, a carriage movable in the guide, an arm pivotally mounted on the carriage and having a member extending into the guide, means for moving the carriage, and means for effecting the swinging of the lever.

11. A package handle wiring machine comprising a guide adapted to receive a handle with its wire extending beyond the sides of the guide, hubs rotatable in bearings at the sides of the guides and having pinions, twisters mounted in the hubs to reciprocate independently of said hubs and to rotate therewith, a carriage movable in said guide, and a rack mounted to move with said carriage and having teeth engaged with the teeth of the twister hub.

12. A package handle wiring machine comprising a carriage movably mounted, a rack independently supported below the carriage, means on the carriage for engaging and moving the rack, yielding bearings between said rack moving means and one end of the carriage, twister hubs journaled at the sides of the path of the carriage and having pinions engaged by the rack, twisters mounted to reciprocate in bores of said hubs and to rotate with the hubs, and means for reciprocating the twisters.

13. A package handle wiring machine comprising a guide along which a handle may be fed in the transverse position, wire bending devices at the sides of the guide, wire twisters rotatably and reciprocatably mounted at the sides of said guide and having slots in their upper ends, means for feeding forward the handle and its wire between the wire bending devices to a point beyond the twisters, means located at this point for guiding the wires in line with the slots in the twisters, means for reciprocating the twisters, to raise them to bring their slots in line with the wires, means for retracting the handle and its wire to enter the ends of the wire in the slots of the twisters, and means for rotating the twisters.

In testimony whereof we affix our signatures in presence of two witnesses.

CLARK REYNOLDS.
ALBERT J. SEAMAN.

Witnesses:
H. J. MILLER,
P. E. TONER.